UNITED STATES PATENT OFFICE.

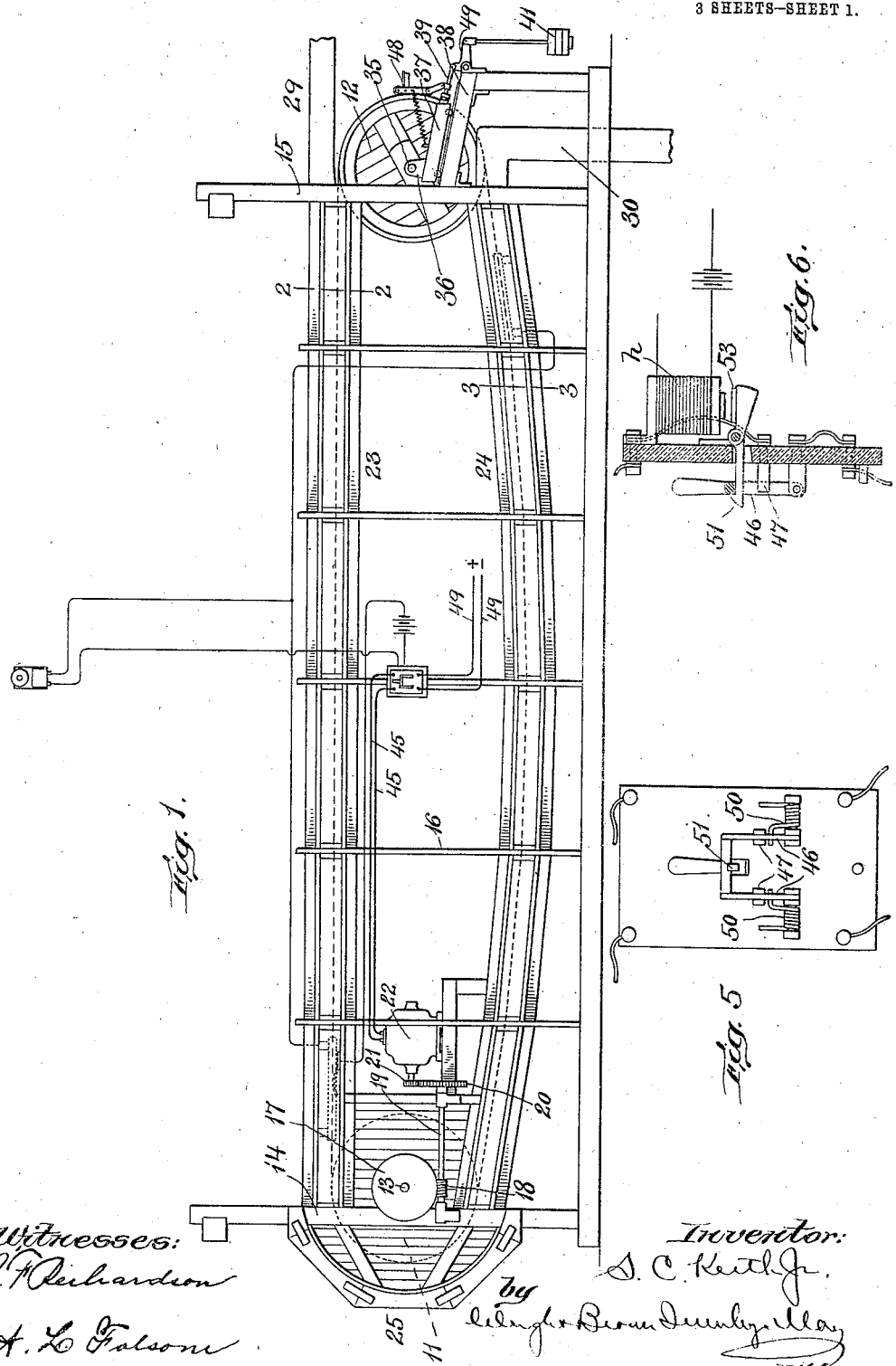

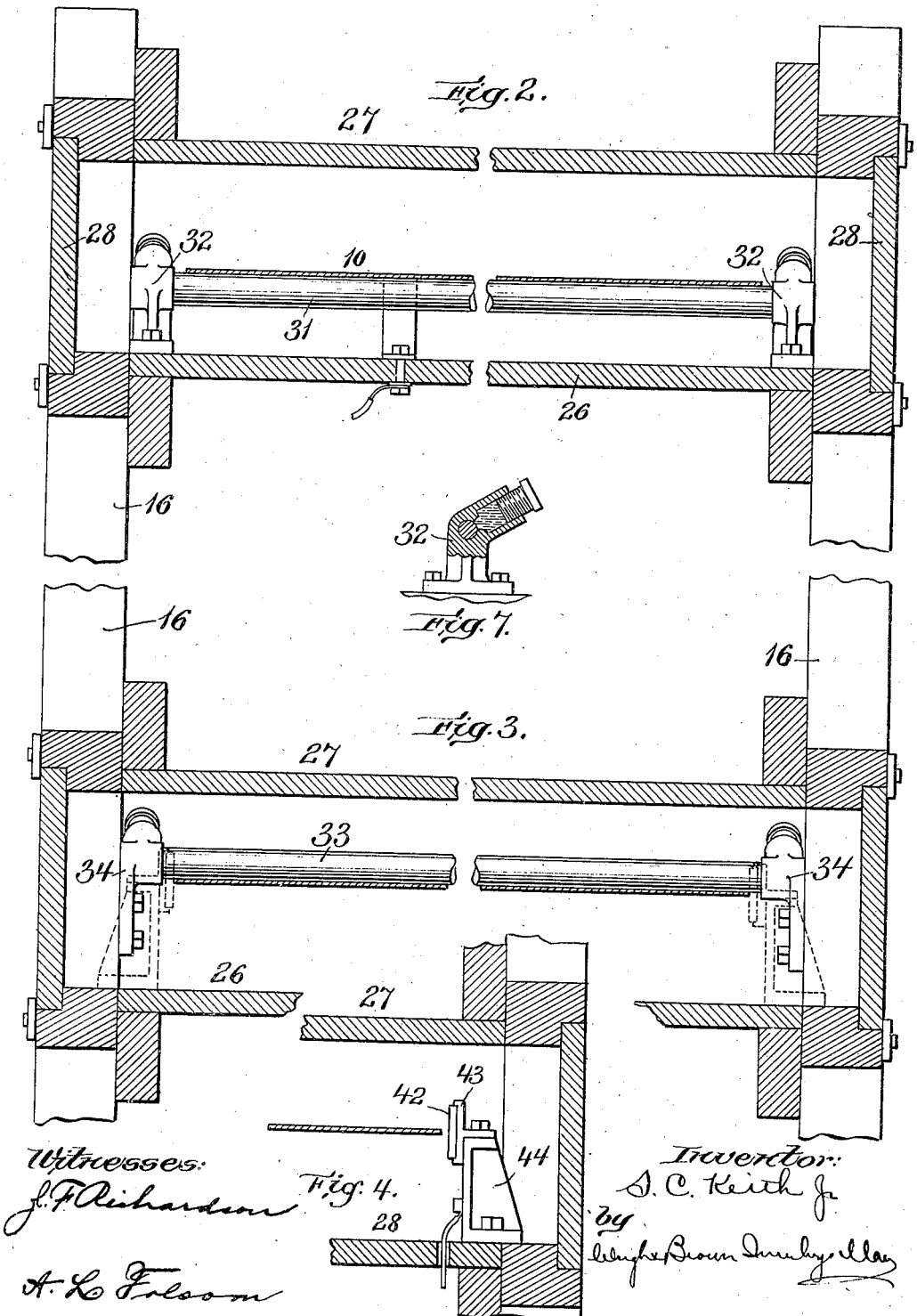

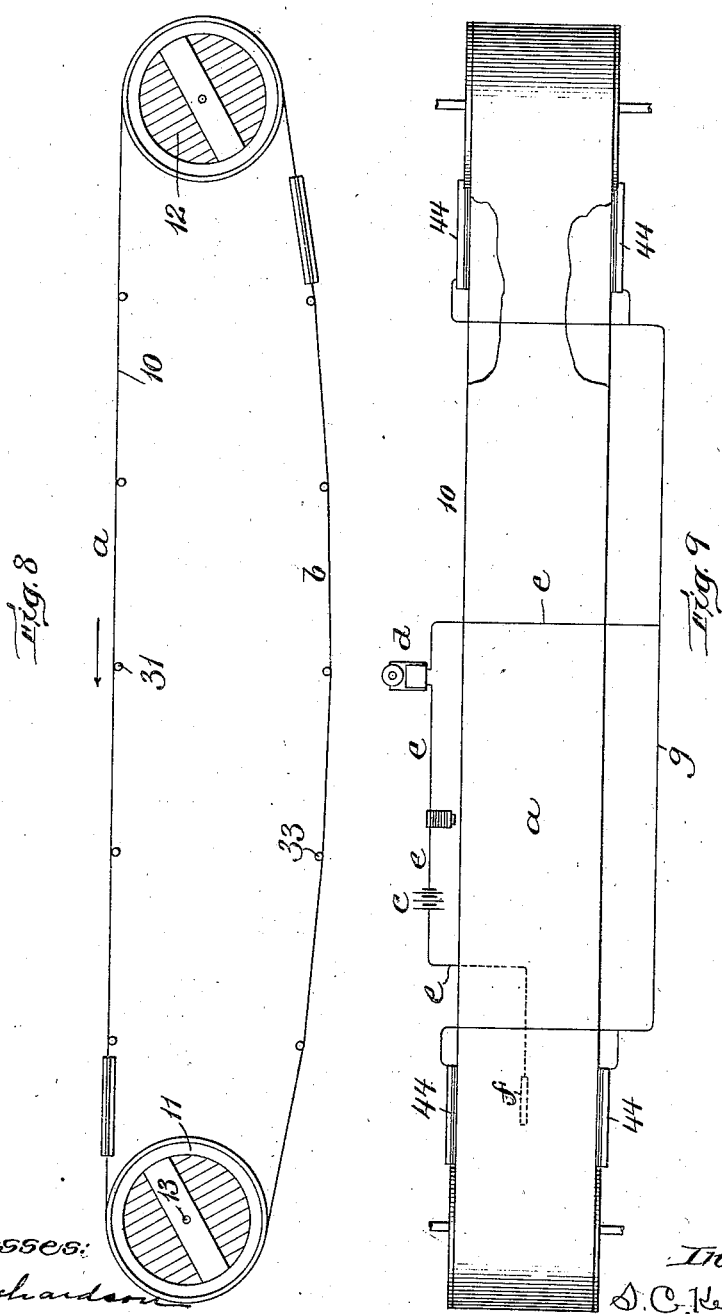

SIMEON C. KEITH, JR., OF SOMERVILLE, MASSACHUSETTS, ASSIGNOR TO H. J. KEITH COMPANY, OF BOSTON, MASSACHUSETTS, A CORPORATION OF MASSACHUSETTS.

DRYING-MACHINE.

991,516.    Specification of Letters Patent.    Patented May 9, 1911.

Application filed January 14, 1908. Serial No. 410,760.

*To all whom it may concern:*

Be it known that I, SIMEON C. KEITH, Jr., of Somerville, in the county of Middlesex and State of Massachusetts, have invented certain new and useful Improvements in Drying-Machines, of which the following is a specification.

This invention has relation to machines for drying liquid materials such as egg, in which an elongated belt is employed for presenting an endless drying surface of considerable area for the reception of the material to be dried, said material adhering thereto, and being subsequently removed. In such machines the belt is usually formed of thin sheet metal and is supported upon drums one of which is rotated to effect the longitudinal movement of the belt.

In order that the liquid material may be exposed to the heated drying medium for a sufficient length of time to effectively dry it, the belt is of considerable length, and where it is arranged approximately horizontal, some means must be provided between the drums for guiding it and preventing it from vibrating. At the same time, it is highly desirable that the belt should have a maximum surface exposed for the reception of the material to be dried in order that the machine may have the greatest efficiency.

One of the objects of the present invention is to provide means for supporting and guiding the belt between the drums without causing the contact of such means with the outer face or surface of the belt, in consequence of which the entire outer face or surface may be used for the reception of the material to be dried. The supporting of the upper stretch of the drum presents little difficulty, since the under surface of the upper stretch may rest upon any suitable guiding and supporting means, such as rolls or the like. The supporting of the under stretch, however, presents a somewhat difficult problem, since if the under face or lower face or surface of the lower stretch of the belt rests upon a guide or support, that portion of the said face or surface which engages the support cannot be utilized for the reception of the material to be dried. I have solved the problem of guiding the lower stretch and holding it against vibratory movement by permitting the said lower stretch to sag or to hang in a catenary curve and providing members for engaging only the upper surface or face of said stretch at various points in its length and thereby guiding and holding it against vibration. In this way I am able to guide the belt between the drums and prevent it from vibrating without permitting the outer surface or face of the belt to come in contact with any part of the machine except the feeding device. Any suitable means may be utilized for guiding the belt and holding it against vibration though I preferably employ transverse members which may take the form of rods or rolls.

As previously stated, the belt is made of thin sheet metal, and on account of its length and longitudinal movement it is apt to creep laterally. I therefore, provide means for preventing, so far as possible, any lateral movement of the belt as might cause injury to the side edges thereof. I utilize guards consisting of flat plates arranged at right angles to the edges of the belt, and I face said plates with a suitable material which cannot injure the said edges. Preferably this material is a non-conductor of electricity, in consequence of which I may utilize an electric circuit which for convenience may include the metallic belt and plates, and which is closed when the said insulating material has worn through so as to notify an attendant by the operation of an indicator or to operate a stop motion for the motor.

Referring to the accompanying drawings, Figure 1 represents in side elevation, an egg-drying machine embodying the invention. Fig. 2 represents a section on the line 2—2 of Fig. 1 on a larger scale. Fig. 3 represents a similar section on the line 3—3 of Fig. 1. Fig. 4 represents a partial section and shows one of the side guides. Figs. 5 and 6 illustrate the switch or member which controls the supply of power for driving the machine. Fig. 7 represents one of the oil cups. Fig. 8 is a conventional view showing the cross rods for the belt. Fig. 9 illustrates conventionally the electric alarm and switch-controlling circuit.

Referring to the drawings, a machine is illustrated which embodies the invention, but I desire to have it understood at the outset that various changes may be made in the details of construction thereof without departing from the spirit and scope of the invention.

The machine comprises an endless belt 10, which is of any desirable width and of sufficient length to effect the drying of the egg which is deposited thereon before another layer of egg is placed upon it. This belt is preferably formed of sheet metal such as zinc. It is supported upon two drums 11, 12. The shaft 13 for the drum 11 is journaled in bearings in one end of the frame, said frame comprising end uprights 14, 15 and intermediate supports 16. Any convenient means may be adopted for effecting the rotation of the drum 13, such as a worm wheel 17 which intermeshes with and is driven by a worm 18 on a shaft 19 suitably journaled on the frame. I have illustrated the shaft 19 as being equipped with a gear 20 driven by a pinion 21 on the driving shaft of an electric motor 22 supported by the frame.

The frame is provided with an elongated inclosed drying chamber in which the belt moves. It is formed in any convenient way and receives a stream of hot air from any convenient source. As illustrated, the drying chamber consists of a hollow boxing which follows the path of the belt. This boxing comprises an upper portion 23, a lower portion 24, and an intermediate portion 25 inclosing the drum 11. The upper portion of the elongated drying chamber is straight as shown, whereas the lower portion is curved for a purpose to be explained. The boxing consists of a lower wall 26, an upper wall 27, and removable sides 28, all suitably connected and mounted upon the supports 14, 15 and 16. Leading into the receiving end of the drying chamber near the drum 22 is a conduit 29 for delivering hot air thereto, there being a conduit 30 which communicates with the delivering end of the lower portion 24 of the chamber for conducting away the air therefrom.

The upper stretch $a$ of the belt is substantially on a horizontal plane and it is supported upon transverse members 31 which consist of rolls having their ends journaled in bearings 32 so that they are free to rotate. They are arranged at proper distances apart so as to support the upper stretch of the belt as it passes from the drum 12 to the drum 11. The lower stretch of the belt is permitted to sag and it extends in substantially a catenary curve from the drum 11 to the drum 12 as shown in Fig. 8. To keep said lower stretch in the same relative position in the conduit and to prevent vibration, there are arranged above the lower stretch of the belt transverse members consisting of cross-rolls 33 whose ends are journaled in bearings 34 attached to the inner surface of the uprights 16 as shown in Fig. 3.

The upper surface of the lower stretch of the belt is held in engagement with the rolls 33 by mounting the shaft 35 of the drum 12 in bearings 36 on a frame 37, which frame is equipped with rolls to slide in guideways on inclined supports 38, there being connected to the frame by links 39, bell cranks 40 from the longer arms of which weights are suspended, so that the drum is movably supported, and the tension exerted by the weights 41 holds the stretches of the belts against the cross-rolls and serves to maintain the belt in its position in the conduit which would otherwise change from expansion or contraction. By this construction the entire outer surface of the belt is out of contact with any supporting or guiding devices, and may be utilized to receive the material to be dried.

The device for feeding the egg to the belt is indicated at 48 and need not be described in detail since it forms the subject-matter of the co-pending application of Herbert J. Keith and myself, Serial No. 401,560, filed November 11, 1907. It is sufficient to state that the feeding device is arranged in front of the drum 12 so as to supply the egg in a thin layer to the belt as it passes around the drum.

In order to safe guard the belt against sidewise or lateral movement, I provide what I term belt-guards. These are arranged near but not necessarily engaging the side edges of the upper stretch $a$ of the belt as it approaches the drum 11 and the side edges of the stretch $b$ as it approaches the drum 12. Each side guard, as shown in Fig. 4, consists of a layer 42 of rawhide or other equivalent tough non-conductible material, which is secured to a plate or backing 43 attached to a standard 44. The standard 44 and plate 43 are formed of metal. It will be seen with this arrangement, in which the layer of rawhide is at right angles to the plane of the belt, that the belt will be restricted against excessive lateral movement and yet will be free to rise and fall.

The standards and plates are connected in an electric circuit as illustrated conventionally in Fig. 9. This circuit includes a battery or source of power $c$, an alarm or indicator $d$, and a conductor $e$ which is connected with a brush or contact bearing against the under surface of the upper stretch $a$ of the belt. The other end of the conductor $e$ is connected to a conductor $f$ which in turn has its ends connected to the four standards 44. The belt is of metal as previously stated, and is therefore a conductor so that, in case the edge of the belt should saw or cut through any one of the belt guards 42, it will make contact with the metal belt 43 to close a circuit through the indicator $d$ so as to notify the attendant of the abnormal lateral position of the belt so that he may stop the machine and readjust the belt to its proper position.

I have also provided means by which the machine may be stopped automatically. I have already stated that the machine is driven by an electric motor 22. The upper circuit 45 is controlled by a switch 46 which is adapted to engage contacts 47 in a circuit 45, said movable contact 46 being connected to the main supply circuit 49. The switch 46 is adapted to be thrown out of engagement with the contacts 47 by springs 50, but it is normally held in engagement therewith by a weighted latch 51. These parts are all mounted upon a suitable switch-board through which the latch 51 extends. On the back of said board is placed an electromagnet $h$ in series in the indicator circuit. The tail of the latch 51 is provided with an armature 53 in operative relation to the magnet $h$ so that, when the magnet $h$ is energized by the closing of the circuit, the latch will be moved to release the switch and the latter will be thrown so as to break the circuit through the motor, and thus stop the machine.

Having thus explained the nature of my said invention and described a way of constructing and using the same, although without attempting to set forth all of the forms in which it may be made or all of the modes of its use, I declare that what I claim is:—

1. A drying machine, comprising supporting drums, an endless drying belt thereon whose lower stretch forms a catenary curve, said belt serving to receive the egg which adheres thereto, members engaging and supporting the under face of the upper stretch of said belt, and members engaging the upper face of the lower stretch and maintaining said stretch in substantially said curve without vibration.

2. A drying machine comprising supporting and driving drums, an elongated endless drying belt to which the egg adheres and from which it may subsequently be removed, and means between said drums for supporting and holding the stretches of said belt against vibration, said means engaging only the inner face or surface of said belt so as to permit the entire area of the outer face or surface to receive the egg to be dried.

3. A drying machine comprising an endless belt, means for supplying egg batter thereto, drums for supporting and driving said belt, the lower stretch of said belt sagging between said drums, transverse members engaging the under and upper surfaces of the upper and lower stretches respectively of the belt, and means for exerting a yielding pressure on one of said drums to move it away from the other.

4. In a drying machine, drums arranged in an approximately horizontal plane, means for drawing one of said drums away from the other, an endless belt on said drums to which adheres the egg batter fed thereto, a feeding mechanism, and means for maintaining the position and preventing the vibration of the stretches of the belt between said drums, comprising transverse members on which the upper stretch rests, and transverse members engaging the upper surface of the lower stretch and arranged in a curve substantially corresponding to the catenary curve of said stretch.

5. In a drying machine, an endless metal drying belt, drums therefor, and means for indicating an abnormal lateral movement of the belt comprising an electric indicator and an electric circuit including said belt closed by said abnormal lateral movement of the belt.

6. In a drying machine, an endless metallic drying belt, drums therefor, belt guards, each comprising a metallic backing and an exposed layer of insulating material, a contact engaged with said belt and an electric circuit including an indicating device, and connected to said contact and to said backings.

7. In a drying machine, an endless metallic drying belt, drums therefor, belt guards, each comprising a metallic backing and an exposed layer of insulating material, a contact engaged with said belt, mechanism for driving one of said drums, a stop motion device therefor, and an electric circuit including said contact, said backing and an electromagnetic mechanism for controlling said stop motion device.

In testimony whereof I have affixed my signature, in presence of two witnesses.

SIMEON C. KEITH, Jr.

Witnesses:
W. W. PEZZETTI,
A. L. FOLSOM.